US008601343B2

(12) United States Patent
Pandel et al.

(10) Patent No.: US 8,601,343 B2
(45) Date of Patent: Dec. 3, 2013

(54) ENCODING AND DECODING METHOD, AND ENCODING AND DECODING DEVICES WITH A TWO-STAGE ERROR PROTECTION PROCESS

(75) Inventors: Jürgen Pandel, Feldkirchen-Westerham (DE); Marcel Wagner, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 345 days.

(21) Appl. No.: 13/022,256

(22) Filed: Feb. 7, 2011

(65) Prior Publication Data

US 2011/0131474 A1 Jun. 2, 2011

Related U.S. Application Data

(63) Continuation of application No. 11/658,667, filed as application No. PCT/EP2005/053076 on Jun. 29, 2005, now abandoned.

(30) Foreign Application Priority Data

Jul. 27, 2004 (DE) .......................... 10 2004 036 383

(51) Int. Cl.
*H03M 13/00* (2006.01)
(52) U.S. Cl.
USPC ............................. 714/755; 714/756; 714/774
(58) Field of Classification Search
USPC .......................................... 714/755, 756, 774
See application file for complete search history.

(56) References Cited

U.S. PATENT DOCUMENTS

| 3,831,143 | A | | 8/1974 | Trafton | |
|---|---|---|---|---|---|
| 4,011,511 | A | | 3/1977 | Chang | |
| 4,375,100 | A | * | 2/1983 | Tsuji et al. | ..................... 714/755 |
| 4,497,058 | A | * | 1/1985 | Sako et al. | ..................... 714/756 |
| 4,546,474 | A | * | 10/1985 | Sako et al. | ..................... 714/756 |
| 4,630,271 | A | | 12/1986 | Yamada | |
| 4,680,764 | A | | 7/1987 | Suzuki et al. | |
| RE33,332 | E | * | 9/1990 | Furuya et al. | ................. 714/755 |
| RE33,462 | E | | 11/1990 | Suzuki et al. | |

(Continued)

FOREIGN PATENT DOCUMENTS

| EP | 1 182 816 | 2/2002 |
|---|---|---|
| JP | 10-178419 | 6/1998 |

(Continued)

OTHER PUBLICATIONS

"Raptor Code Specification for MBMS File Download", 3GPP Doc. S4-040230, 3GPP SA4 PSM Ad-Hoc#31, May 2004, 8 pp.

(Continued)

*Primary Examiner* — Joseph D Torres
(74) *Attorney, Agent, or Firm* — Staas & Halsey LLP

(57) ABSTRACT

An encoding method and device are provided for a series of data packets transmitted in the framework of a combined streaming and downloading application by a two-stage error protection process and only one unidirectional transmission channel. A partial block of successive data packets is protected against some transmission errors occurring during streaming with the aid of a first error protection process while all data packets are protected against the transmission errors that can remain after streaming is completed with the aid of a second error protection process. In a decoding process, a series of data packets that are encoded according to the encoding are decoded.

17 Claims, 6 Drawing Sheets

(56) References Cited

U.S. PATENT DOCUMENTS

| | | | |
|---|---|---|---|
| 4,998,252 A | | 3/1991 | Suzuki et al. |
| 5,357,526 A | * | 10/1994 | Jang et al. ............... 714/755 |
| 5,371,745 A | * | 12/1994 | Kiyonaga et al. .......... 714/758 |
| 5,436,917 A | | 7/1995 | Karasawa |
| 5,712,861 A | | 1/1998 | Inoue et al. |
| 5,740,187 A | * | 4/1998 | Tanaka ..................... 714/755 |
| 5,745,502 A | * | 4/1998 | Khayrallah et al. ......... 714/751 |
| 5,757,825 A | | 5/1998 | Kimura et al. |
| 5,790,569 A | | 8/1998 | Kojima et al. |
| 5,809,042 A | * | 9/1998 | Nakamura et al. .......... 714/756 |
| 5,881,037 A | | 3/1999 | Tanaka et al. |
| 5,883,891 A | | 3/1999 | Williams et al. |
| 5,901,127 A | * | 5/1999 | Sako et al. ............... 369/59.24 |
| 5,901,159 A | | 5/1999 | Ichikawa |
| 5,920,578 A | | 7/1999 | Zook |
| 5,974,580 A | | 10/1999 | Zook et al. |
| 5,991,911 A | | 11/1999 | Zook |
| 5,996,105 A | | 11/1999 | Zook |
| 6,047,395 A | | 4/2000 | Zook |
| 6,048,090 A | | 4/2000 | Zook |
| 6,061,760 A | | 5/2000 | Huang |
| 6,122,764 A | * | 9/2000 | Kobayashi ................ 714/758 |
| 6,126,310 A | * | 10/2000 | Osthoff et al. ............. 714/751 |
| 6,175,686 B1 | | 1/2001 | Noda |
| 6,181,784 B1 | * | 1/2001 | Duran et al. .............. 379/93.21 |
| 6,182,263 B1 | | 1/2001 | Kojima et al. |
| 6,185,715 B1 | | 2/2001 | Fang et al. |
| 6,223,324 B1 | | 4/2001 | Sinha et al. |
| 6,357,030 B1 | | 3/2002 | Demura et al. |
| 6,367,047 B1 | | 4/2002 | McAuliffe et al. |
| 6,401,228 B1 | | 6/2002 | Ichikawa et al. |
| 6,421,805 B1 | | 7/2002 | McAuliffe |
| 6,567,951 B2 | | 5/2003 | Senshu |
| 6,591,390 B1 | * | 7/2003 | Yagyu ..................... 714/755 |
| 6,643,816 B1 | * | 11/2003 | Uesugi et al. ............. 714/758 |
| 6,662,335 B1 | | 12/2003 | Huang |
| 6,718,510 B2 | | 4/2004 | Kojima |
| 6,721,917 B2 | * | 4/2004 | Shieh ....................... 714/755 |
| 6,751,771 B2 | | 6/2004 | Chuang et al. |
| 6,757,860 B2 | | 6/2004 | Choi et al. |
| 6,772,385 B2 | * | 8/2004 | Ohyama et al. ............ 714/755 |
| 6,772,386 B2 | | 8/2004 | Iwata et al. |
| 6,839,007 B2 | * | 1/2005 | Zhao et al. ................. 341/94 |
| 6,907,561 B2 | | 6/2005 | Kojima |
| 7,003,711 B2 | | 2/2006 | Noda et al. |
| 7,007,221 B2 | | 2/2006 | Nagai et al. |
| 7,007,222 B2 | | 2/2006 | Huang |
| 7,017,102 B1 | | 3/2006 | Kristensson et al. |
| 7,124,345 B2 | | 10/2006 | Kojima |
| 7,249,305 B2 | | 7/2007 | Kojima et al. |
| 7,293,218 B2 | | 11/2007 | Kojima |
| 7,302,630 B2 | | 11/2007 | Kojima |
| 7,305,606 B2 | | 12/2007 | Hoshizawa et al. |
| 7,310,763 B2 | | 12/2007 | Kojima |
| 7,346,828 B2 | | 3/2008 | Kojima |
| 7,350,128 B2 | | 3/2008 | Kojima |
| 7,350,129 B2 | | 3/2008 | Kojima |
| 7,356,754 B2 | | 4/2008 | Kojima |
| 7,363,571 B2 | | 4/2008 | Kojima |
| 7,370,259 B2 | | 5/2008 | Kojima |
| 7,370,267 B2 | | 5/2008 | Shim et al. |
| 7,380,194 B2 | | 5/2008 | Kojima |
| 7,380,196 B2 | | 5/2008 | Kojima |
| 7,383,491 B2 | | 6/2008 | Shim et al. |
| 7,389,463 B2 | | 6/2008 | Ramaswamy et al. |
| 7,389,468 B2 | | 6/2008 | Albrecht et al. |
| 7,401,285 B2 | | 7/2008 | Shim et al. |
| 7,408,863 B2 | | 8/2008 | Iwata et al. |
| 2002/0056064 A1 | | 5/2002 | Kidorf et al. |
| 2002/0083391 A1 | | 6/2002 | Huggett et al. |
| 2002/0095638 A1 | * | 7/2002 | Weng et al. ............... 714/785 |

FOREIGN PATENT DOCUMENTS

| | | |
|---|---|---|
| JP | 2000-349792 | 12/2000 |
| JP | 2001-244947 | 9/2001 |
| WO | 02/098003 | 12/2002 |

OTHER PUBLICATIONS

"Channel Coding Schemes with Incremental Redundancy for MBMS", 3GPP Doc. GP-031391, 3GPP TSG GERAN Meeting #15, Jun. 2003, pp. 1-9.
A. Shokrollahi, "LDPC Codes: An Introduction", Apr. 2003, printed from www.ipm.ac.ir/IPM/homepage/Amin2.pdf, pp. 1-34.
J. Rosenberg et al., "An RTP Payload Format for Generic Forward Error Correction", IETF RFC 2733, Dec. 1999, pp. 1-26.
M. Bossert, "Kanalcodierung", Teubner, Stuttgart, 1992, Foreword and Table of Contents (pp. 7-10) (English Abstract).
F.J. MacWilliams et al., Theory of Error-Correcting Codes, ISBN 0444851933, 1977, (Methods for combining codes) pp. 567-571.
U.S. Appl. No. 11/658,667, filed Jan. 26, 2007, Juergen Pandel et al., Nokia Siemens Networks GMBH & Co. KG.
Office Action issued on Jun. 24, 2010 in Parent U.S. Appl. No. 11/658,667.
Office Action issued on Dec. 7, 2010 in Parent U.S. Appl. No. 11/658,667.

\* cited by examiner

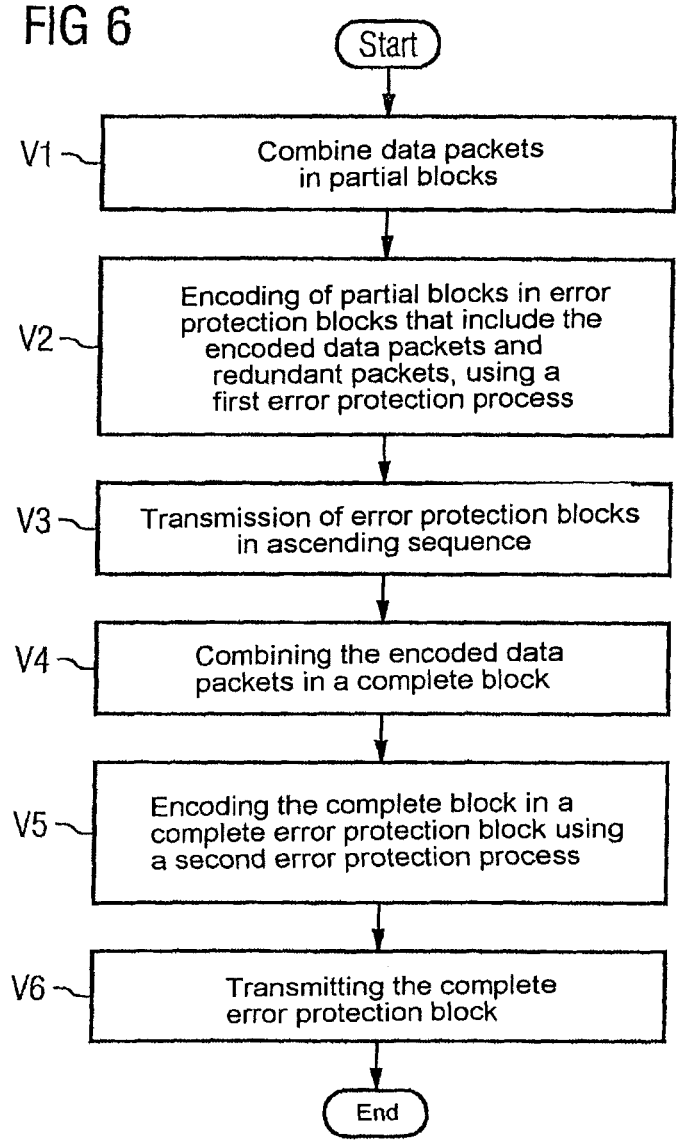

US 8,601,343 B2

ENCODING AND DECODING METHOD, AND ENCODING AND DECODING DEVICES WITH A TWO-STAGE ERROR PROTECTION PROCESS

CROSS REFERENCE TO RELATED APPLICATIONS

This application is a continuation application of U.S. Ser. No. 11/658,667, filed on Jan. 26, 2007, which is a 371 national stage application of PCT International Application No. PCT/EP2005/053076 filed on Jun. 29, 2005, which in turn claims priority to German Application No. 10 2004 036 383.8 filed on Jul. 27, 2004, the contents of all of which are hereby incorporated by reference.

BACKGROUND OF THE INVENTION

Internet-based applications have become increasingly popular in recent years. One class of applications is streaming applications. A user can hereby access multimedia content online with the aid of a streaming protocol. Examples of multimedia content are text, graphics, music, video or a mixture of same. A video clip with music is an example of multimedia content. In this context, online means that immediately after receipt of the first packets at the user, said packets are played back, e.g. at a loudspeaker. A complete downloading, for example of the video clip, is not necessary. In addition to the possibility that a content server provides the multimedia content for retrieval, the multimedia content can be recorded and edited in real time and forwarded directly to a user via a streaming application without buffer storage on a so-called content server. Multimedia content of this kind recorded and transmitted in real time is, for example, a radio program (web radio). Saving the multimedia content, e.g. on a content server, is not necessary in this case.

Furthermore, download applications such as the loading of MP3 pieces of music or MPEG-2 feature films are very popular. In this case, the multimedia content is encoded using a standard compression method according to MP3 or MPEG-2 video for instance, and provided on a content server for downloading. First, the user loads the complete multimedia content onto his device, e.g. onto his computer or mobile phone and after completion of the download process this media content can be played back, e.g. on a monitor.

Furthermore, hybrids of streaming and of the download application are also discussed. For example, with a music distribution service, a user can select a piece of music by using his device, his mobile phone for example, and load it on to his device by payment of a purchase price. In this way, the user is able to listen to the piece of music during the download process and then after it has been loaded on to his device he is able to play back the complete piece of music as often as required. The user hereby receives the impression that the piece of music is streamed, whereas in fact the complete piece of music is nevertheless present on his device after completion of the streaming process. With this hybrid, a point-to-point connection currently exists between the device of the user and the content server.

In addition to this hybrid streaming and download application, point-to-multipoint connections should also be possible. A point-to-multipoint connection is also known as "broadcast" or "multicast" In the following; this hybrid is referred to as a broadcast application. With this application, the same multimedia content is available to several users at the same time. An example of this is a music video that is broadcast live to the user and may be recorded.

In addition to an excellent picture and sound quality, the user of a broadcast application of this kind also expects no transmission errors to occur within the multimedia content. Despite expensive error protection processes, residual errors in the physical layer and radio link layer occur during the transmission of data packets via mobile radio channels. A typical value for a residual error is approximately 1%. Whereas data packets with transmission errors transmitted using a point-to-point connection can be repeated with the aid of an ARQ (Automatic Repeat Request) process, this is generally not economically feasible with broadcast and multicast applications, so that data packets with errors are received. Therefore, with these broadcast applications, the multimedia content is transmitted by a unidirectional transmission channel and a return channel is not available. A broadcast application of this kind is known for example from VHF (radio technology). With the use of the IP protocol (Internet Protocol), data packets containing errors also lead to the complete data packets being lost which means that the multimedia content cannot be played back correctly.

In addition to data transmission containing errors via mobile radio channels, data packets losses can also occur due to a radio cell change. In individual cases, an interruption in data transmission of approximately 10 seconds can occur during a radio cell change. Whilst the data packets for purely broadcast download applications can be reconstructed with the aid of suitable measures such as interleaving, even where there are long interruptions, this method cannot be applied for streaming applications because of the time delay. A number of processes are known for reconstructing data packets that contain errors or have been lost, such as are given in references including:

J. Rosenberg, H. Schulzrinne, "An RTP Payload Format for Generic Forward Error Connection", IETF RFC 2733, December 1999, http:///www.ietf.org GPP Doc. GP-031391: "Channel Coding Schemes with Incremental Redundancy for MBMS", 3GPP TSG=GERAN Meeting #15, Fort Lauderdale, Fla., June 2003

Shokrollahi, "LDPC Codes; An Introduction", April 2003, http://www.ipm.ac.ir/IPM.homepage/Amin2.pdf GPP Doc. S4-040230, "Raptor Code Specification for MBMS file download", 3GPP TSG-SA4 Meeting #31, Montreal, Canada, May 2004, http://www.3gpp.org Bossert, "Kanalcodierung", B. G. Teubner, 1992 ("the Error Protection Art").

SUMMARY OF THE INVENTION

The inventors propose an encoding method for transmitting a series of data packets via at least one unidirectional transmission channel within the framework of a combined streaming and downloading application with a two-stage error protection process. According to the method, a partial block of successive data packets is protected against at least part of the transmission errors that occur during streaming with the aid of a first error protection process and with the aid of second error protection process all data packets are protected against transmission errors remaining after completion of the streaming.

On the one hand, the method enables the playback of a series of data packets during streaming. This guarantees, with the aid of a first error protection process, that at least part of the transmission errors caused by the transmission can be corrected and thus at least a part of the data packets can be reconstructed without errors. Thus, despite errors in transmission, the playback of at least part of the data packets is guaranteed.

Furthermore, all data packets are available in reconstructed form after completion of the streaming. This corresponds to the download of the series of data packets. With the aid of the second error protection process, those reconstructed data packets that could not be reconstructed error free by the first error protection process can be corrected. This means that a user can play back the data packets during the streaming, e.g. as a piece of music, and after completion of the streaming these data packets that sometimes still contain faults can be reconstructed error free for output at a later time point, e.g. through a loudspeaker.

The method is advantageous in practice, as, on one hand, no return channel is required for transmission and therefore the method can be used for a point-to-multipoint connection. On the other hand, the two-stage error protection process, i.e. the first and second error protection process, means that a first number of errors per partial block can be corrected by the first error protection process and that only those errors that could not be removed using the first error protection process, such as longer burst of errors, have to be improved using the second error protection method.

Furthermore, several successive data packets are combined in each instance to form a partial block for transmission of series of data packets, with an error protection block being created for each partial block with the aid of the first error protection process in such a way that each error protection block includes several error protection packets, that each error protection block represents at least one error protection packet, an encoded data packet and at least one other error protection packet represents a redundant block, and that an encoded data packet is formed per data packet, the error protection blocks are transmitted sequentially in the time sequence in which the associated data packets are temporally played back, the encoded data packets are combined to form a complete block, a complete error protection block is generated for the complete block with the aid of the second error protection process and the complete error protection block is transmitted after transmission of all the error protection blocks belonging to the series.

By using this preferred embodiment, the method can be implemented in several steps in a simple manner, e.g. with the aid of an encoding device.

At least one of the following error protection algorithms, EXOR parity code, Reed Solomon code and/or low density parity check codes is preferably used for the first and/or second error protection process. With the aid of at least one of these error protection algorithms, the first and/or second error protection process can be implemented in an advantageous manner.

If a number of packets of data packets of the partial block are determined as a function of a specifiable delay, taking account of a transmission rate, a redundant block length and an encoded data packet length, the number of packets can be adjusted to achieve a minimum delay for the playback of data packets, such as a piece of music for instance.

In an alternative variant, a characteristic value is created for each data packet using a statistical method, with the characteristic value representing the importance of the respective data packet in respect of at least one other data packet, and a number of packets of data packets being created for the partial block in such a way that a sum of characteristic values of successive data packets within the respective partial block reaches at least one specifiable threshold. This enables a small number of data packets with particularly important information and a larger number of data packets with unimportant information to be combined in a partial block. If, for example, a redundant block of the same length is created for all partial blocks, partial blocks with a lower number of packets of data packets are better protected against errors than partial blocks with a larger number of packets of data packets. For example, an important data packet receives packet information that is required for all data packets for decoding purposes.

The data protection block is preferably created in such a way that the encoded data packets within the error protection block are provided with unequal error protection. In this way, one or more encoded data packets comprise more error protection than other encoded data packets of the same error protection block. In the event of encoded data packets being transmitted with errors, encoded data packets with more error protection can be corrected and other encoded data packets with less error protection can be subjected to a non error-free reconstruction.

Additionally, encoded data packets containing important information can be provided with more error protection and other encoded data packets containing less important information can be provided with less error protection. This means that at least the encoded data packets containing the important information can be reconstructed in an error-free manner.

In a particularly preferred embodiment, the error protection block is created in such a way that a specifiable number of error blocks of erroneous error protection packets within the respective error protection block can be corrected by the respective error protection block. In this way, a correction characteristic of the error protection block can be individually matched, e.g. to an error susceptibility of the transmission channel.

In an alternative embodiment, at least one erroneous error protection packet within the error protection block can be corrected by the respective error protection block. In this way, a minimum correction property of the error correction block can be guaranteed.

In a preferred alternative variant, at least two successive erroneous error protection packets within the error protection block can be corrected by the respective error correction block. Many transmission systems, such as UMTS (Universal Mobile Telecommunications System) use a fault correction and interleaving process to avoid transmission errors. If, however, this error protection fails, e.g. due to too many errors, two or more encoded data packets in succession can be erroneous. Therefore, this embodiment represents a particularly advantageous variant taking account of common transmission systems, such as UMTS.

If the complete error protection block is created in such a way that a larger number of erroneous encoded data packets within the error protection block can be corrected than by the first error protection process, it is guaranteed that a larger number of erroneous encoded data packets, that could not be corrected by the first error protection process, are reconstructed in an error-free manner with the aid of the complete error protection block after complete transmission of all encoded data packets.

Advantageously, the complete error protection block is created in such a way that, with the help of several segments of the complete error protection block, different subsets of encoded data packets can be corrected. In this way, error protection algorithms that have a limitation with respect to the number of data packets can also be used for the second error protection process. For example, only 255 encoded data packets can be protected by a Reed-Solomon code in the Galois-feld "$2^8$". By dividing the encoded data packets into several subsets, e.g. into four subsets each with 200 encoded data packets, the aforementioned condition can be complied with by the Reed-Solomon code.

In a preferred variant, the encoded data packets when transmitting the error protection blocks are transmitted via a first transmission channel and the redundant blocks via a second transmission channel. This enables the encoded data packets and the complete error protection block of the first transmission channel to be processed with a less complex download application, and the encoded data packets, the redundant blocks and the complete error protection block of both transmission channels to be processed with a more complex application.

In a particularly preferred embodiment, the encoded data packets and the redundant blocks are transmitted synchronized in such a way that the redundant block of the respective error protection block is present at the receiver not later than the point in time at which the last encoded data packet of the respective error protection block also arrives at the receiver. This guarantees that where two transmission channels are used there is a minimum delay for the playback of the data packets during the streaming.

Furthermore, the inventors propose to a decoding method by which a sequence of encoded data packets encoded according to an encoding method can be decoded. In this way, data packets encoded with the method can be reconstructed.

Furthermore, the inventors propose an encoding device with units for performing an encoding process. This enables the encoding method to be implemented and executed in the encoding device, especially a mobile radio device, a portable device and/or a stationary computing device.

Furthermore the inventors propose to a decoding device with units for implementing a decoding method. In this way, the decoding method can be implemented and executed in the decoding device, particularly a mobile radio device, a portable device and/or a stationary computing device.

BRIEF DESCRIPTION OF THE DRAWINGS

These and other objects and advantages will become more apparent and more readily appreciated from the following description of the preferred embodiments, taken in conjunction with the accompanying drawings of which:

FIG. 6 shows a flow diagram showing the process steps of the encoding method.

DETAILED DESCRIPTION OF PREFERRED EMBODIMENT

Figure 1A:
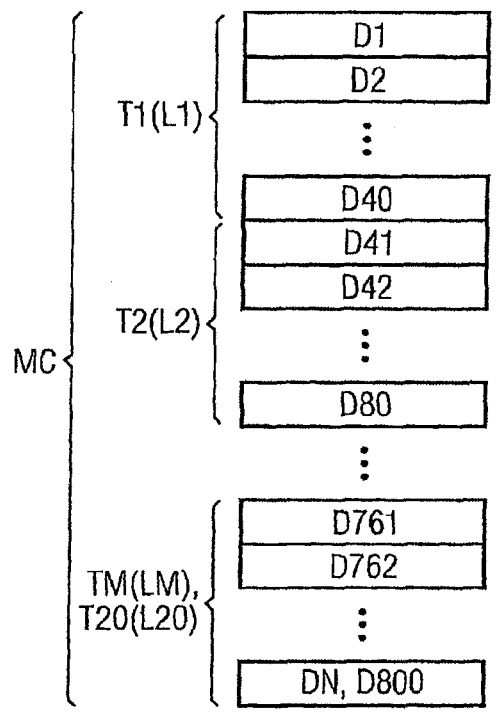
FIGS. 1a-1e show a first exemplary embodiment with several data packets for implementing the individual process steps of the encoding method.

Reference will now be made in detail to the preferred embodiments, examples of which are illustrated in the accompanying drawings, wherein like reference numerals refer to like elements throughout.

The individual process steps of the method are explained in more detail in the following with the aid of FIGS. 1a to 1e. FIG. 6 shows the process steps in the form of a flow diagram. In a first exemplary embodiment, a music video clip is being transmitted from a video server to a mobile terminal. The music video clip according to FIG. 1a includes N=800 data packets D1, . . . , D800=DN, with it being initially assumed that all data packets D1 . . . , D800 have the same data packet length PL. A data packet D1, . . . , D800, for example, includes a number of bits or bytes, e.g. a data packet length PL of 320 bytes.

In a first process step V1, several successive data packets D1, . . . , DN are combined to form a partial block T1, . . . , TM in each instance. In FIG. 1a, every 40 data packets form a partial block, for example data packets D41, . . . , D80 form partial block T2. In this exemplary embodiment, 40 data packets are always combined to form a partial block. A number of packets L1, . . . , LM, that give the number of data packets contained for each partial block T1, . . . , TM, therefore amounts to 40, i.e. L1=L2= . . . =L20=40. However, in general any number of data packets D1, . . . , DN can be combined to form a partial block T1, . . . , TM, with it being possible for this number of packets L1, . . . , LM to vary from partial block to partial block. After completion of this process step, all data packets D1, . . . , DN are assigned to a partial block T1, . . . , TM.

In a second processing step V2, an error protection block F1, . . . , FM is formed for each partial block T1, . . . , TM with the aid of a first error protection process FS1. A plurality of systematic and non-systematic error protection algorithms (codes) for use as an error protection process are known from the Error Protection Art.

Figure 1B:
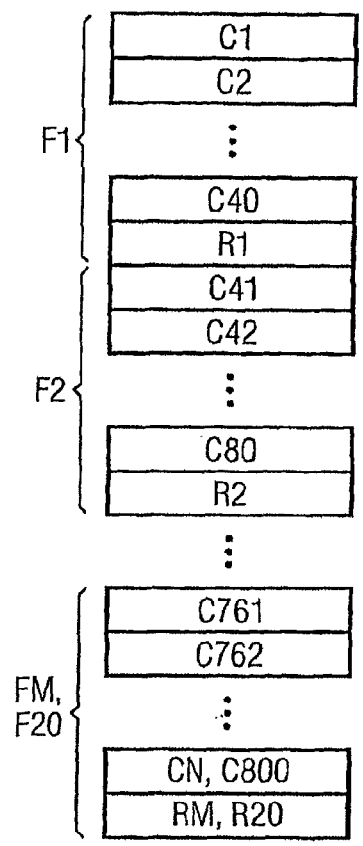

In this case, the first error protection process FS1 can correspond to an EXOR parity code, a Reed-Solomon code (RS) or also a low density parity check code. After encoding with the aid of the first error protection process FS1, an error protection block F1, . . . , F20 contains, as shown in FIG. 1b, 40 encoded data packets C1, . . . , C800 and a redundant block R1, . . . , R20. In this process, a data packet D1, . . . , DN is assigned each encoded data packet C1, . . . , CN. In this exemplary embodiment, the redundant blocks R1, . . . , R20 each contains 320 bytes. The encoded data packets C1, . . . , C800 and the redundant blocks R1, . . . , R20 are also designated as error protection packets. Therefore, for example, an erroneous error protection packet can be corrected within the error protection block F1, . . . , F20.

In practice, the use of a systematic error protection algorithm is appropriate for the first error protection process FS1, because in this way data packets D1, . . . , DN appear unchanged in the encoded data packets C1, . . . , CN. On the other hand, for non-systematic codes, an encoding of data packets D1, . . . , DM is performed in such a way that a binary content of the encoded data packet C1, . . . , CN does not correspond to the binary content of the respective data packet D1, . . . , DN. When systematic error protection algorithms are used, it is advantageous that a receiver can, in a case where no error occurs in the transmission of the encoded data packets C1, . . . , CN, obtain the data packets D1, . . . , DN directly by copying from the encoded data packets C1, . . . , CN without having to use the first error protection process FS1 for decoding. This substantially reduces the complexity involved in performing a decoding process using systematic error protection algorithms at the receiver end.

Figure 1C:
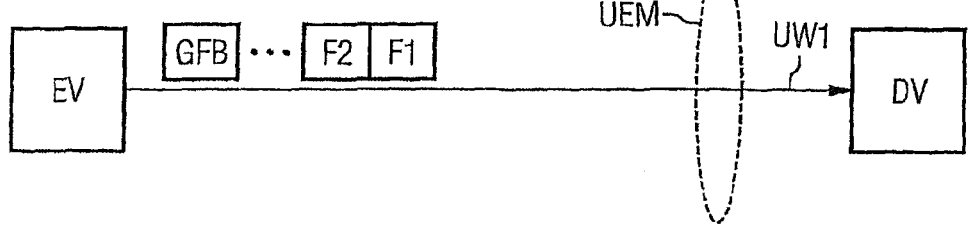

The error protection blocks F1, . . . , FM are transmitted in a third process step V3. In this case, the error protection blocks F1, ..., FM are transmitted in such a way that error protection block F1, that represents data packets D1, ..., D40, that are to be played back first, is transmitted first, and error protection block F20, that represents data packets D761, ..., D800, that are to be played back last, is transmitted last. This is shown in FIG. 1c. Error protection block F1 is first transmitted, then F2 and finally F20. The transmission of error protection blocks F1, ..., FM in this sequence guarantees that a receiver first receives all the error protection packets of error protection block F1, so that after any necessary correction of erroneous received error protection packets and the necessary decoding where non-systematic codes are used, the 40 reconstructed data packets D1, ..., D40 can be forwarded immediately for play back, for example to a loudspeaker. If, for example, all the encoded data packets C1, ..., C800 were transmitted first and then all redundant blocks R1, ..., R20 were transmitted, the receiver would, if a fault occurred, for example in the encoded data packet C40, have to first receive all 800 encoded data packets C1, ..., C800 and then proceed with the error correction or decoding. Therefore, transmitting encoded data packets C1, ..., C40 of the first error protection block F1 and of the redundant block R1 together means that with a short delay of 41 packets, 40 encoded data packets and a redundant block, the playback of the music video clip can be started during the streaming, after a slight delay.

The delay V created by this method is explained in the following by an example. A transmission medium UEM, through which the error protection packets F1, ..., FM are transmitted, has a transmission bandwidth UR of 64 kbit/s. Each error protection packet of the error protection block F1, ..., FM contains 40 encoded data packets and a redundant block with an encoded data packet length CL1, ..., CLN, with for example CL1, ..., CLN being equal to 320 bytes and a redundant block length J1, ..., JM with J1, ..., JM being equal to 320 bytes. Therefore a maximum delay V for the playback of the music video clip is obtained as follows.

$$V = \frac{CL1 * 40 + J1}{UR}$$
$$= \frac{320 \text{ bytes} \cdot (40 + 1)}{64 \text{ kbit/sec}}$$
$$= \frac{13120 \text{ sec}}{8000}$$
$$= 1.64 \text{ sec}$$

Consequently the maximum delay V is 1.64 seconds. If the user wanted to transmit all error protection packets of all error protection blocks F1, ..., FM before the music video clip playback, then in the event of an erroneous transmission, he will have to allow for a maximum delay of $$V = \frac{CL1 * 800 + J1 * 20}{UR} = \frac{320 \text{ bytes} * (800 + 20))}{8000 \text{ bytes/sec}} = 32.8 \text{ sec}$$

until the complete music video clip was ready for playback.

With data transmission over mobile radio channels, short error burst occur more frequently than long ones because long error bursts, for example, occur only at very few handovers. Therefore, it is advantageous to configure the error protection block F1, ..., FM by the first error protection process, FS1 in such a way that a small number of erroneous transmitted error protection packets are corrected within the respective error protection block F1, ..., FM, such as, for example, one or two error protection packets per error protection block F1, ..., FM. Furthermore, with a large error protection in the error protection packet there will be a greater overhead to be transmitted. In this example a correction by the first error protection process FS1 would not be possible where there were more than two erroneous transmitted error protection packets and the user would have to allow for an interruption in the music clip for a time period V, for example of 1.64 sec. As is shown again later it should be possible to rectify such errors by a second error protection process FS2, so that on completion of the download an error-free music video clip would be available. Furthermore it is expedient if when choosing the first error protection process FS1 an error protection algorithm is chosen that can correct erroneous error protection packets regardless of how they are arranged, especially encoded data packets C1, ..., CN, within the error protection block F1, ..., FM.

Furthermore it is useful for the error protection block F1, ..., FM to be created in such a way that a specified number of error blocks FF of encoded data packets C1, ..., CN and redundant blocks R1, ..., RM can be corrected within the error protection block F1, ..., FM. With known error correction algorithms, such as those in the Error Protection Art, this can be achieved by a suitable dimensioning of the redundant blocks R1, ..., RM. Let us assume, for example, that all encoded data packets C1, ..., CN are of equal length, e.g. 100 bytes each. In this way, one error protection packet per error protection block F1, ..., FN can be corrected by a redundant block R1, ..., RM 100 bytes long. If 2×100 bytes=200 bytes per redundant block R1, ..., RM are used, it is possible, for example, to correct two encoded data packets C1, ..., CN per error protection block F1, ..., FM. This procedure can be analogously extended to achieve a correction characteristic of three or more encoded data packets C1, ..., CN for each error protection block. The respective redundant block R1, ..., RM can then also be corrected in addition to the encoded data packets C1, ..., CN.

Figure 1D:
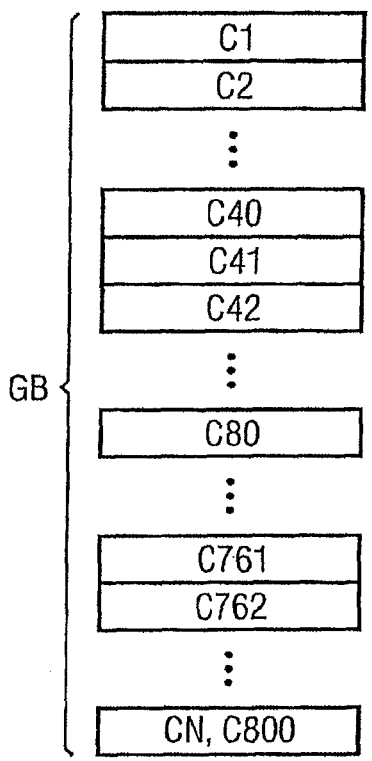
Figure 1E:
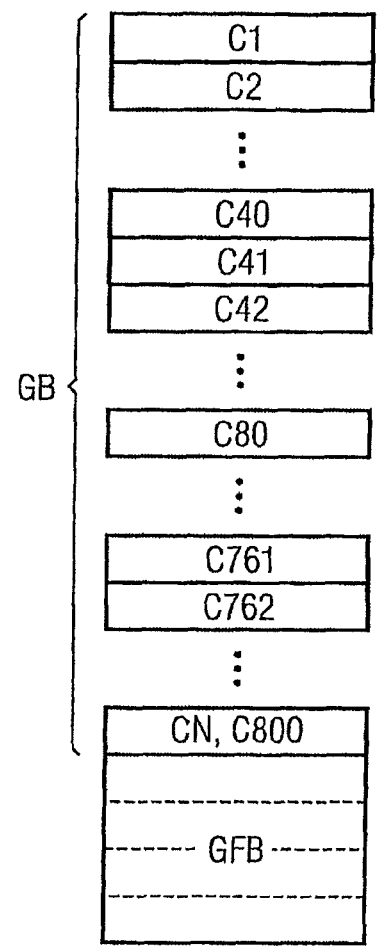

In a fourth process step V4, the encoded data packets C1, ..., CN are combined in a complete block GB. An example of this is shown in FIG. 1d.

In a fifth process step V5, a complete error protection block GFB is created for the complete block GB with the aid of a second error protection process FS2. Known error protection algorithms such as those in the Error Protection Art can be used for this purpose. In contrast to the first error protection process FS1, only systematic error protection algorithms may, however, be used for the second error protection process FS2, because the use of non-systematic error protection algorithms would cause a binary change to the content of the encoded data packets and thus a correction or decoding by the first error protection process FS1 would only be possible after decoding by the second error protection process FS2. In the following, the encoded data packet C1, ..., CN transmitted to the receiver are designated as transmitted encoded data packets E1, ..., EN, with it being possible for these transmitted encoded data packets E1, ..., EN to have transmission errors due to a transmission that is susceptible to errors.

In practice, it is furthermore useful if more erroneous transmitted encoded data packets E1, ..., EN can be corrected with the aid of the complete error protection block GFB rather than with the respective error protection block F1, ..., FM. It is assumed, for example, that due to a handover ten transmitted encoded data packets E51, ..., E60 were erroneously transmitted within the partial block T2. Because the error protection block F2 can only correct two of the erroneous transmitted encoded data packets E51, ..., E60 by using its redundant block R2, a (complete) error correction is not possible in this way. However, with the aid of the complete error protection block GFB, that for example can correct up to 20 erroneous transmitted encoded data packets E1, . . . , EN, these ten erroneous transmitted encoded data packets E51, . . . E60 can be reconstructed error-free within the partial block T2. A precondition for this is, however, that only ten other transmitted encoded data packets E1, . . . , E50, E61, . . . , EN were received erroneously. Otherwise, there would be more erroneous transmitted data packets E1, . . . , EN present than could be corrected by the second error protection process FS2.

In a sixth step V6, the complete error protection block GFB is transmitted after error protection blocks F1, . . . , FM. This means that on completion of the streaming all error protection blocks F1, . . . , FM are available, in addition to the complete error protection block GFB, for correction of the errors that could not be corrected by error protection block F1, . . . , FM.

In a possible expansion of the method, the number of packets L1, . . . , LM of data packets D1, . . . , DN of the partial block T1, . . . , TM are determined as a function of a specifiable delay V, taking account of a transmission rate UR, an encoded data packet length C1, . . . , CLN and a redundant block length J1, JM. The encoded data packet length CL1, . . . , CLN includes the number of symbols, e.g. of bytes, per encoded data packet, CL1, . . . , CN. The redundant block length J1, . . . , JM describes the number of symbols, e.g. bytes per redundant block, R1, . . . , RM. This is explained in more detail in the following example.

Encoded data packet length CL1=CL2= . . . =CLN=500 bytes
Redundant block lengths J1=J2= . . . =JM=500 bytes
delay V=3 seconds
Transmission rate UR 128 kbit/sec=16 kbyte/sec By using these parameters, the number of packets L1, . . . , LM of data packets of the partial block T1, . . . , TM can be calculated as follows.

$$L1 \ldots = LM \frac{V \cdot UR \cdot J1}{CL1} = \frac{3 \text{ sec} \cdot 16 \text{ kbyte/sec} \cdot 500 \text{ byte}}{500 \text{ byte}} = 95 \text{ packets}$$

A maximum of 95 encoded data packets and, because one data packet is assigned per encoded data packet, therefore 95 data packets may be contained in the partial block T1, so that at the given parameters a maximum delay V of 3 seconds is not exceeded. In the above example, it was assumed that the encoded data packet length CL1, . . . , CLN is identical in each encoded data packet C1, . . . , CN. In general, the encoded data packets C1, . . . , CN and data packets D1, . . . , DN can exhibit any length.

In an expansion of the method, the number of packets L1, . . . , LM of data packets is determined on the basis of characteristic values W1, . . . , WN of successive data packets D1, . . . , DN, with the characteristic value W1, . . . , WN representing the importance of the respective data packet D1, . . . , DN in respect of at least one other data packet D1, . . . , DN. For example, every tenth data packet D1, D11, D21, . . . , D791 contains parameters that are important for all data packets D1, . . . , DN. All other data packets D2, D3, . . . , D10, D12, . . . , DN contain only multimedia information parameters, such as PCM (Pulse Code Modulation) data that can be decoded independent of other PCM data. With the aid of a statistical method, a characteristic value W1, . . . , WN is first assigned to each data packet D1, . . . DN. For example, the influence the error of a specific data packet D1, . . . , DN has on the playback quality, such as for the audio quality of a piece of music, is determined by measurement. In another embodiment of a statistical method, the important data packets D1, D11, D21, . . . , D791 are assigned a characteristic value W1=W11= . . . =5 and the less important data packets D2, D3, . . . , DN are assigned the important value W2=W3= . . . =WN=1. In a further example, the data packets D1, . . . , DN represent an encoded video signal. In this case, the data packets that include movement vectors are particularly important for the decoding, whereas on the other hand the remaining data packets that contain the encoded residual error signal have a lesser importance in respect of the picture quality. Therefore, for example, the characteristic values of the important data packets have a higher value and the less important data packets a lower value. By presetting a specifiable threshold WS, a value is now specified that should not exceed a sum of characteristic values W1, . . . , WN of successive data packets D1, . . . , DN within the respective partial block T1, . . . , TN. The following parameter values are examples.

Specifiable threshold WS=35
Characteristic value W1=W11=W21= . . . =5
Characteristic value W2=W3=W4= . . . =WN=1

The number of data packets L1, . . . , LM of data packets for the partial block T1, . . . , TM is determined by the summation of characteristic values W1, . . . , WN of successive data packets D1, . . . , DN. For the example we get the following.

$$L1 = W1 + W2 + W3 + W4 + \ldots + W23 = 35 \leq WS.$$

Partial block T1 therefore includes data packets D1, . . . , D23, with the number of data packets L1 being 23. With this expansion of the method, the number of packets, L1, . . . , LM of data packets for the partial block T1, . . . , TM is determined as a function of the respective characteristic values W1, . . . , WN and the specifiable threshold WS. The procedure for other numbers of packets L2, . . . , LM of data packets is the same as the procedures for the number of packets L1.

Figure 2:
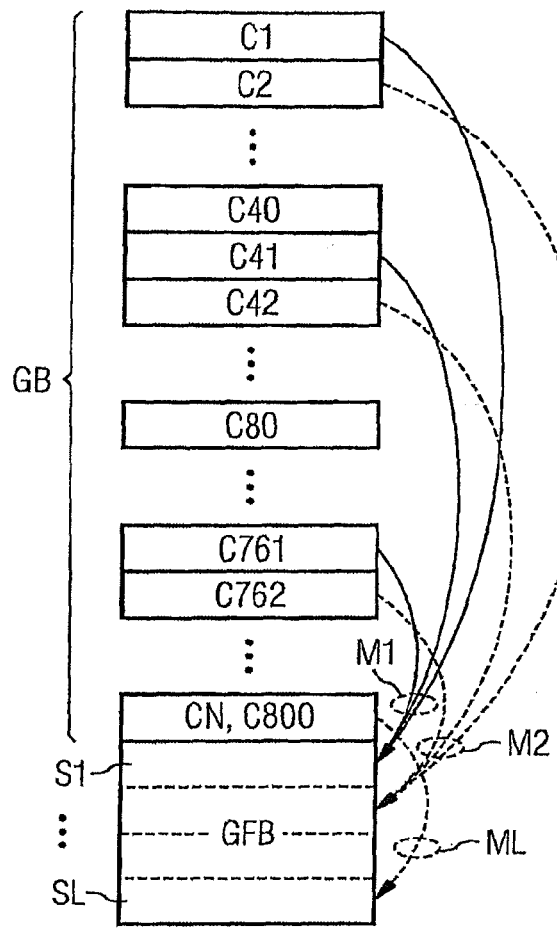
FIG. 2 shows a creation of a complete error protection block with various segments of the complete error protection block protecting different subsets of encoded data packets.

FIG. 2 shows an alternative variant of the method where the complete error protection block GFB is created. For this process, the complete error protection block GFB is divided into segments S1, . . . , SL with each segment S1, . . . , SL being able to correct a subset M1, . . . , ML of encoded data packets C1, . . . , CN. In the exemplary embodiment shown in FIG. 2, the encoded data packets C1, C41, C81, . . . , C761 represent the subset M1. For this subset M1, a segment S1 is created with the aid of a second error protection process FS2. The subset M2 contains the encoded data packets C2, C42, C82, C762. Segment S2 includes an error protection for the subset M2. Further subsets M3, . . . , ML and segments S3, . . . , SL can be formed in a similar manner. Generally, the subsets M1, . . . , ML can be created from any combination of encoded data packets C1, . . . , CN, with it being possible to include one or more encoded data packets C1, . . . , CN in more than one subset M1, . . . , ML. The size of the segments S1, . . . , SL can also vary. Thus, for example, segment S1=100 bytes and segment S2=320 bytes.

According to the exemplary embodiment shown in FIG. 1c, the error protection blocks F1, . . . , FM, are first transmitted in succession and then the complete error protection block GFB is transmitted. In this process, the error protection blocks F1, . . . , FM and the complete error protection block GFB are sent via a first transmission channel UW1. In an alternative variant according to FIG. 3, two transmission channels UW1, UW2 can also be used to send the encoded data packets C1, . . . , CN, the redundant blocks R1, . . . , RM and the complete error protection block GFB. In this way, all the encoded data packets C1, . . . , CN and the complete error protection block GFB can be sent via the first transmission channel UW1 and the redundant blocks R1, . . . , RM via the second transmission channel UW2. This is advantageous because it means that the encoded data packets C1, . . . , CN can be transmitted by the first transmission channel UW1 in such a way that these can be supported, received and further processed by receiver devices that hold only a download of multimedia content, i.e. of encoded data packets C1, . . . , CN. Furthermore by adding the redundant blocks R1, . . . , RM, that are sent by the second transmission channel UW2, an application that realizes a hybrid of download and streaming application, whereby a redundant block R1, . . . , RM can be received for each error protection block F1, . . . , FM and if errors occur these can be corrected by the respective redundant block R1, . . . , RM. When two transmission channels UW1, UW2 are used, it is useful in practice for both error protection processes FS1, FS2 to use systematic error protection algorithms, because otherwise the encoded data packets C1, . . . , CN can under certain circumstances not be decoded without using the redundant blocks R1, . . . , RM.

Figure 3:
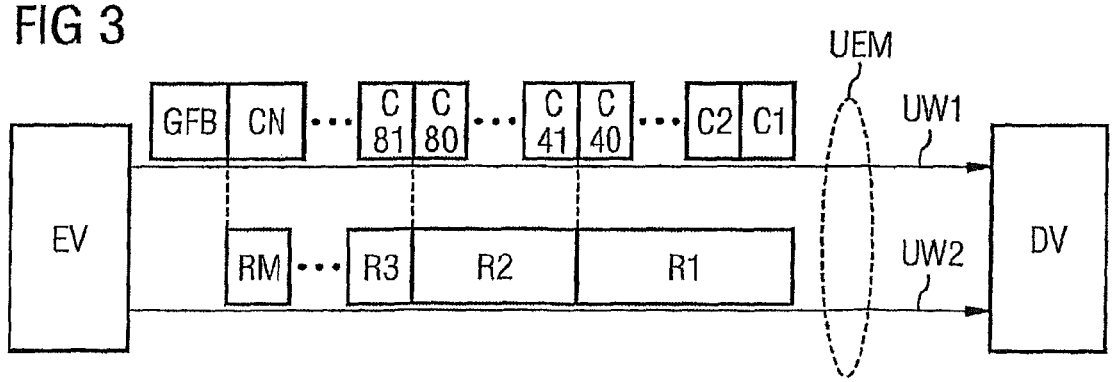
FIG. 3 shows a transmission of encoded data packets via a first transmission channel and of redundant blocks via a second transmission channel.

Furthermore, it is useful for the encoded data packets C1, . . . CN and the redundant blocks R1, . . . , RM to be transmitted synchronized in such a way that the redundant block R1, . . . , RM of the respective error protection block F1, . . . , FM is present at the receiver not later than the point in time at which the last encoded data packets C1, . . . , CN of the respective error protection block F1, . . . , FM arrive at the receiver. This is further explained using FIG. 3. Thus, for example, the redundant block R1 arrives at the receiver device with the latest encoded data packet C40 of the error protection block F1. This similarly applies to the further partial blocks T2, . . . , TM, with for example the redundant block R2 being present at the receiver with the arrival of the encoded data packet C80, the last encoded data packet of the error protection block F2. This relationship is shown in FIG. 3 by a dotted line. Because of this synchronization, all error protection packets of an error protection block F1, . . . , FM are present at the receiver when the last encoded data packet C1, . . . , CN arrives and therefore a correction of erroneous transmitted error protection packets, and also a playback of data packets D1, . . . , DN reconstructed from the encoded data packet C1, . . . , CN can be achieved with minimum delay.

Figure 4:
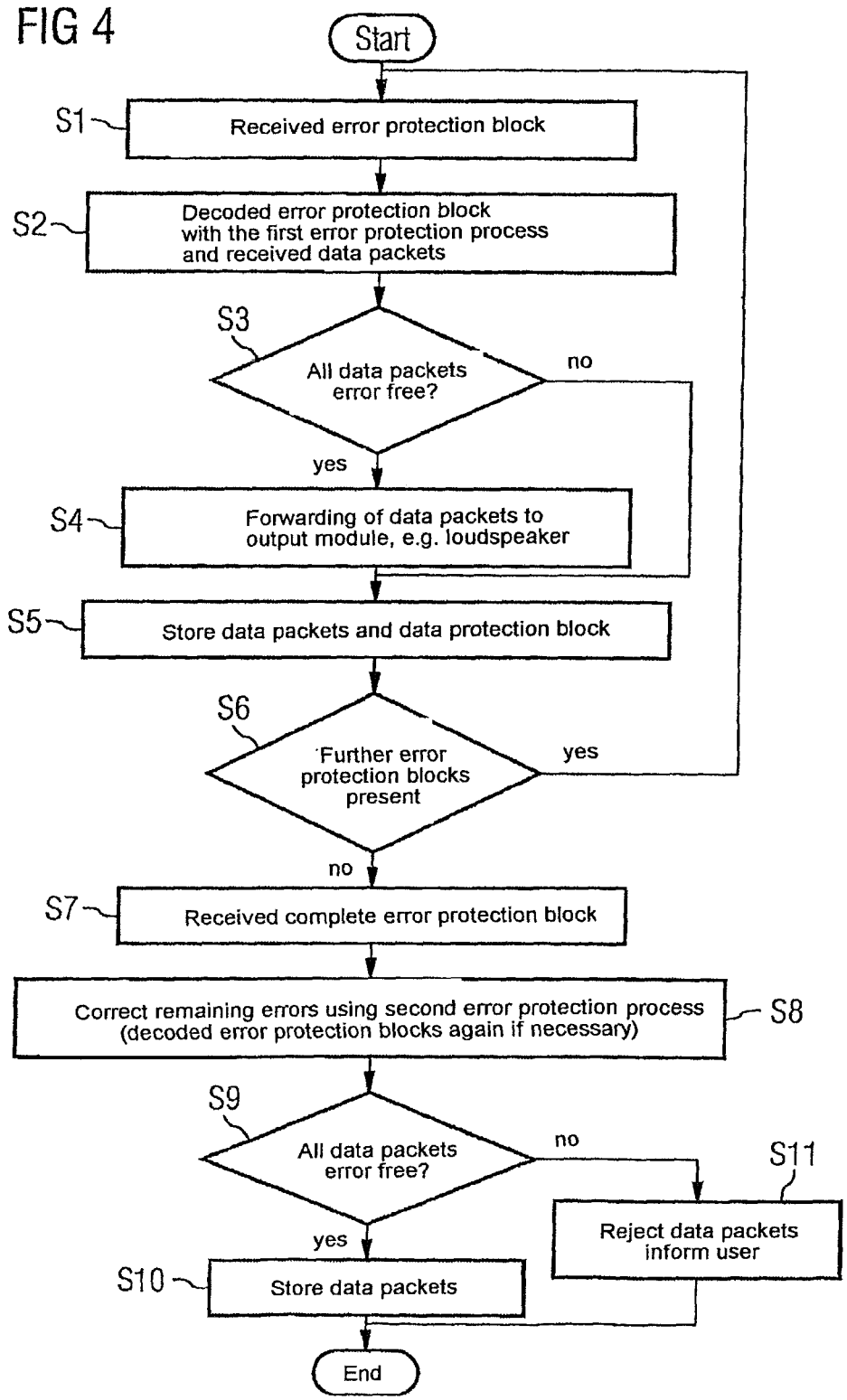
FIG. 4 shows a flow diagram showing an example of the process steps at the receiver end for decoding the received encoded data packets and reconstructing the data packets.

Furthermore, in a decoding method data packets D1, . . . , DN can be reconstructed with the aid of the error protection that was created according to an encoding process. From an encoding device EV, the error protection packets that include the encoded data packets C1, . . . , CN and the redundant blocks R1, . . . , RM are transmitted to a decoding device DV, whereby the error protection packets can arrive with errors at the decoding device DV due to the erroneous transmission via the transmission medium. These error protection packets that arrive at the decoding device DV are designated as transmitted erroneous protection packets. An exemplary embodiment for the decoding process is explained in more detail in the following with the aid of FIG. 4.

In step S1, the transmitted error protection packets of an error protection block F1, . . . , FM are received.

In step S2 the transmitted error protection packets of the error protection block F1, . . . , FM are decoded with the aid of the first error protection process FS1 and reconstructed data packets G1, . . . , GN are created from this. These reconstructed data packets G1, . . . , GN represent the data packets D1, . . . , DN at the receiver but because of transmission errors the reconstructed data packets G1, . . . , GN can differ from data packets D1, . . . , DN. In a variant, a systematic error protection algorithm (code) is used for the first error protection process FS1.

In this way, if none of the transmitted error protection packets that represent encoded data packets C1, . . . , CN were received with errors, the reconstructed data packets G1, GN of the partial block T1, . . . , TN can be reconstructed by copying the transmitted encoded data packets.

In step S3, the reconstructed data packets G1, . . . , GN of the partial block T1, . . . , TM are checked to determine whether all can be reconstructed in an error-free manner. If this is the case, the process continues with step S4, if not then with step S5.

In step S4 the reconstructed data packets G1, . . . , GN of the partial block T1, . . . , TM are forwarded to an output medium, e.g. to a loudspeaker module, for playing back.

In step S5 the received error protection block and the reconstructed data packet G1, . . . , GN are stored.

In step S6 a check is now carried out to determine whether a further error protection block F1, . . . , FM is ready for reception. If this is the case, the process is started again with step S1, otherwise it continues with step S7.

In step S7 the complete error protection block GFB is received that, under certain circumstances, contains errors due to transmission via the error-prone transmission medium UEM.

In step S8 residual errors of the reconstructed data packets G1, . . . , GN, which could not be corrected by the first error protection process FS1, are corrected with the aid of the second error protection process FS2. In the following, those transmitted error protection packets that in each case represent encoded data packets C1, . . . , CN are designated encoded data packets E1, . . . , EN. Depending on the error protection algorithm employed in the first error protection process FS1, the two following error correction procedures are, for example, expedient.

a) By using a systematic error protection algorithm for the first error protection process FS1, all transmitted encoded data packets E1, . . . , EN that could be reconstructed in an error-free manner by the first error protection process FS1 are replaced by the respective reconstructed data packet G1, . . . , GN. Then, with the aid of the second error protection process FS2, a reconstruction of all transmitted encoded data packets E1, . . . , EN is performed and the reconstructed data packets G1, . . . , GN thus created.

b) Where a non-systematic error protection algorithm is used for the first error protection process FS1, the reconstructed data packets G1, . . . , GN of those error protection blocks F1, . . . , FM, that could be fully reconstructed, are encoded as encoded auxiliary packets by the first error protection process FS1. The transmitted encoded data packets E1, . . . , EN of these error protection blocks F1, . . . , FM are then replaced by these encoded auxiliary packets. This reduces the number of errors in the erroneously transmitted encoded data packets because it has been possible to already improve some erroneous encoded data packets with the aid of the first error protection process FS1. In a subsequent process step, the transmitted, and already partially corrected, encoded data packets are corrected by the second error protection process FS2 with the aid of the received complete error protection block GFB. The reconstructed data packets G1, . . . , GN are then obtained for each error protection block F1, FM, by the first error protection process FS1 using the partially corrected and transmitted encoded data packets.

In step S9 a check is carried out to determine whether all the reconstructed data packets G1, . . . , GN can be restored to an error-free state. If this is the case, the process continues with step S10; otherwise it continues with step S11.

In step S10 the reconstructed data packets G1, ..., GN are saved, for example so that a user or also the decoding device DV can output these to a loudspeaker module at a later point in time.

In step S11 the reconstructed, but erroneous, data packet G1, ..., GN are rejected and the user can be informed that the reconstructed data packets G1, ..., GN, i.e. the music video clip cannot be stored because of uncorrectable errors. As an alternative, the reconstructed data packets G1, ..., GN can be stored but the user must then allow for short interruptions or an erroneous playback when these are output, e.g. to the loudspeaker module. Furthermore, the decoding device DV can achieve an improvement in quality by using veiling methods, for example by interpolation of audio data. In a further alternative, the receiver, e.g. the decoding device DV, can transmit control information to the transmitter, e.g. the encoding device EV, via a return channel, to be established, that can reconstruct data packets that are not error-free. The transmitter can then establish a protected point-to-point connection to this receiver and re-send data packets that are still absent and/or contain errors to said receiver. In a further alternative, redundant packets can be sent via the point-to-multipoint connection to all receivers. With the aid of these redundant packets, that for example contain redundant information for one or more data packets, the data packets that contain errors and/or are missing can be reconstructed. This is then advantageous if an error-free reconstruction of the data packets is not possible with several receivers. By transmitting the data packets via a transmission channel that is susceptible to errors, data packets can also become lost. Lost data packets can be replaced by any data packet during the decoding, with this replaced data packet being marked as erroneous. In this way, a decoding can take place that takes account of data packets that are merely erroneous.

An encoding device EV includes units for implementing the encoding method. In this case, the encoding device EV, is, for example, integrated into a data computer such as a content server or a mobile radio network, by which the process of encoding can be realized. In a further application, the encoding device EV can also be fitted in a mobile terminal, with the mobile terminal, for example, taking a sequence of pictures by a camera and these pictures being compressed by a video compression process and data packets D1, ..., DN being generated from same. These data packets D1, ..., DN can then be encoded according to the method and then transmitted via a network such as a GSM (Global System for Mobile Communication) network.

Furthermore, a decoding device DV has units for performing the decoding method. With the aid of the decoding device DV, the method can be realized and used in a receiver device, for example in a mobile radio telephone according to the UMTS (Universal Mobile Telecommunications System) standard.

Figure 5:
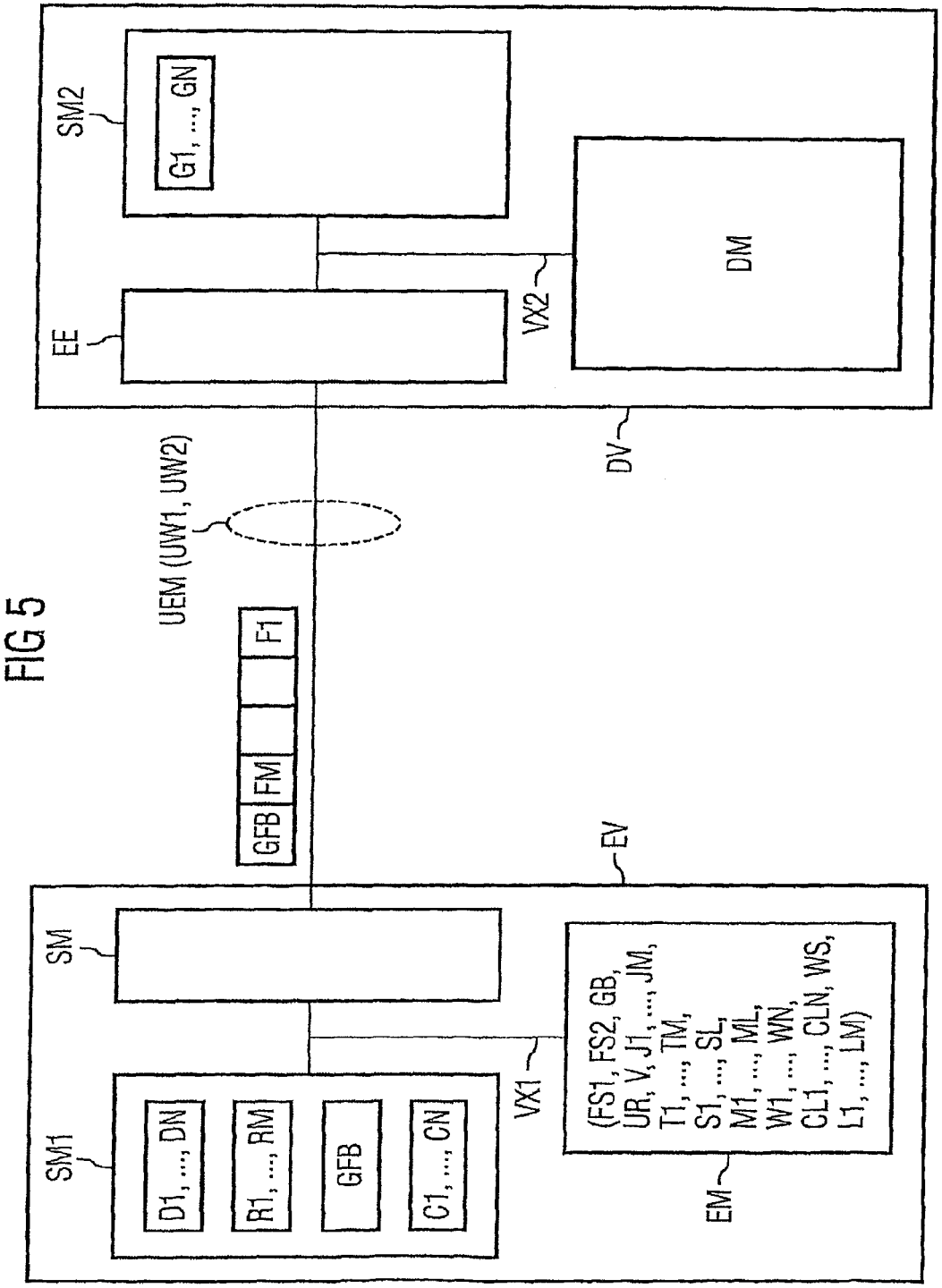
FIG. 5 shows an encoding device for performing an encoding process, a transmission medium and a decoding device for performing a decoding process.

The encoding device EV and the decoding device DV are shown in FIG. 5. The encoding device EV contains a first storage module SM1, for example for storing data packets D1, ..., DN. Furthermore, the encoding device EV also contains an encoding module EM by which individual steps for performing the method for encoding can be realized. Furthermore, the encoding device EV includes a transmitting module SM by which, for example, the error protection blocks F1, ..., FM and the complete error protection block GFB can be transmitted via the transmission medium UEM to the decoding device DV. The first memory module SM1, the transmitting module SM and the encoder module EM are interconnected via a first connecting network VX1 in order to exchange data and control information between one another.

The transmission medium UEM enables the transmission of error protection blocks F1, ..., FM and of the complete error protection block GFB. For example, the transmission medium UEM is embodied in the form of a wireless network according to the GSM and/or UMTS standard, or in the form of a wired network, such as an ISDN (Integrated Digital Subscriber Network) or an IP (Internet Protocol) based intranet and/or internet. When transmitting using the transmission medium UEM, individual packets and/or blocks can be erroneously transmitted.

The partially erroneous transmitted packets and blocks are received by a receiving module EE of the decoding device DV. These are stored in a second storage module SM2 for further processing. The reconstructed data packets G1, ..., GN, that represent data packets D1, ..., DN, are created in several steps with the aid of the decoding module DM. These are stored, e.g. in the second storage module SM2 for further processing, for example by a loudspeaker unit. The second storage module SM2, the receiving module EE and the decoder module DM are interconnected to each other by a second connecting network VX2, for the exchange of data and control information.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method of streaming media content in the form of a series of data packets transmitted via at least one unidirectional transmission channel comprising:

dividing the series of data packets into partial blocks, each being formed from a plurality of successive data packets, and applying a first error protection process to encode each partial block of successive data packets to protect the data packets against transmission errors occurring during streaming of the media content;

applying a second error protection process to encode all data packets to protect the data packets against transmission errors occurring during streaming of the media content;

receiving first transmitted error protection blocks and applying a first decoding process based upon the first protection blocks corresponding to the first error protection process to a partial block of the data packets and if the partial block contains no errors, providing the partial block for play back of content represented by the partial block;

in the event that reconstruction of the data packets of the partial block by applying the first decoding process is unable to provide error-free reconstructed data packets, storing for second decoding processing the data packets instead of playing back content represented by the partial block; and receiving subsequently transmitted second error protection blocks and applying, to the stored data packets, a second decoding process corresponding to the second error protection process based upon the second protection blocks to correct errors.

2. The method as claimed in claim 1, wherein at least one of the following error protection algorithms is used for the first and/or second error protection process:
EXOR parity code;
Reed-Solomon code; and
Low density parity check code.

3. The method as claimed in claim 2, wherein a characteristic value is created for each data packet by a statistical method, the characteristic value represents an importance of the respective data packet with respect to at least one other data packet, the quantity of data packets for the partial block is selected in such a way that a sum of characteristic values of successive data packets within the respective partial block reaches at least one specifiable threshold.

4. The method as claimed in claim 1, wherein the quantity of error detection packets in the partial block is determined as a function of a specifiable delay, taking account of a transmission rate, a redundant block length and an error detection packet length.

5. The method as claimed in claim 1, wherein a characteristic value is created for each data packet by a statistical method, the characteristic value represents an importance of the respective data packet with respect to at least one other data packet, the quantity of data packets for the partial block is selected in such a way that a sum of characteristic values of successive data packets within the respective partial block reaches at least one specifiable threshold.

6. The method as claimed in claim 1, wherein an error protection block is formed for each partial block, the error protection block having encoded data packets provided with unequal error protection.

7. The method as claimed in claim 6, wherein error detection data packets containing important information have more error protection and error detection data packets containing less important information have less error protection.

8. The method as claimed claim 1, wherein an error protection block is formed for each partial block in such a way that a specifiable number of erroneous error detection packets can be corrected within the error protection block by the first error protection process.

9. The method as claimed in claim 1, wherein at least one erroneous error detection packet within an error protection block formed for each partial block can be corrected by the first error protection process.

10. The method as claimed in claim 1, wherein at least two successive erroneous error detection packets within an error protection block formed for each partial block can be corrected by the first error protection process.

11. The method as claimed in claim 1, wherein a complete error protection block is created by applying the second error protection process in such a way that a greater number of erroneous error detection data packets can be corrected with the second error protection process than with the first error protection process.

12. The method as claimed in claim 1, wherein a complete error protection block is created by applying the second error protection process in such a way that it has segments formed by reordering error detection packets, each segment being formed such that errors are separately corrected within the segment.

13. The method as claimed in claim 1, wherein during the transmission of error protection blocks, the error detection packets are transmitted via a first transmission channel and redundant blocks are transmitted via a second transmission channel.

14. The method as claimed in claim 13, wherein the error detection packets and the redundant blocks are transmitted in synchronization in such a way that the redundant block of the respective error protection block is present at a receiver not later than a time of reception of a last error detection packet of the respective error protection block.

15. The method as claimed in claim 1, wherein, play back occurs while partial blocks are being transmitted.

16. A system for streaming media content in the form of a series of data packets transmitted via at least one unidirectional transmission channel comprising:
a partial block generator to divide the series of data packets into partial blocks, each being formed from a plurality of successive data packets, and apply a first error protection process to encode each partial block of successive data packets to protect the data packets against transmission errors occurring during streaming of the media content;
an encoder to apply a second error protection process to all data packets to protect the data packets against transmission errors occurring during streaming of the media content;
a block handler to receive first transmitted error protection blocks and apply a first decoding process based upon the first protection blocks corresponding to the first error protection process to a received partial block of the data packets and if the partial block contains no errors, to provide the partial block for play back of content represented by the partial block, and if reconstruction of the data packets of the partial block by applying the first decoding process is unable to provide error-free reconstructed data packets, reconstructed data packets are provided for storing for second decoding processing instead of for playing back content represented by the partial block; and
a decoder to receive subsequently transmitted second error protection blocks and apply, to the stored reconstructed data packets, a second decoding process corresponding to the second error protection process based upon the second protection blocks to correct errors.

17. A decoding device for decoding streaming media content in the form of a series of data packets received via at least one unidirectional transmission channel, the series of data packets comprising a series of partial blocks, comprising:
a block handler to receive first transmitted error protection blocks and apply a first decoding process based upon the first protection blocks corresponding to the first error protection process to a received partial block of the data packets and if the partial block contains no errors, to provide the partial blocks for play back of content represented by the partial block, and if reconstruction of the data packets of the partial block by applying the first decoding process is unable to provide error-free reconstructed data packets, reconstructed data packets are provided for storing for second decoding processing instead of for playing back content represented by the partial block; and
a storage handler to receive subsequently transmitted second error protection blocks and apply, to the stored reconstructed data packets, a second decoding process corresponding to the second error protection process to correct errors.

* * * * *